(12) United States Patent
Jiang et al.

(10) Patent No.: US 11,142,108 B2
(45) Date of Patent: Oct. 12, 2021

(54) BUSHING ARRANGEMENT FOR HEADREST ASSEMBLY

(71) Applicant: Daimay North America Automotive, Inc., Redford, MI (US)

(72) Inventors: Yintai Jiang, Shanghai (CN); Jianhua Wang, Novi, MI (US); Guojun Tang, Shoushan (CN)

(73) Assignee: Daimay North America Automotive, Inc., Redford, MI (US)

( * ) Notice: Subject to any disclaimer, the term of this patent is extended or adjusted under 35 U.S.C. 154(b) by 0 days.

(21) Appl. No.: 16/765,498

(22) PCT Filed: Apr. 20, 2018

(86) PCT No.: PCT/CN2018/083917
§ 371 (c)(1),
(2) Date: May 20, 2020

(87) PCT Pub. No.: WO2019/200610
PCT Pub. Date: Oct. 24, 2019

(65) Prior Publication Data
US 2021/0023972 A1     Jan. 28, 2021

(51) Int. Cl.
  *B60N 2/824*   (2018.01)
  *B60N 2/894*   (2018.01)
  *B60N 2/815*   (2018.01)

(52) U.S. Cl.
  CPC ............ *B60N 2/824* (2018.02); *B60N 2/894* (2018.02); *B60N 2/815* (2018.02)

(58) Field of Classification Search
  None
  See application file for complete search history.

(56) References Cited

U.S. PATENT DOCUMENTS

| 3,512,833 A | 5/1970 | Sugiura |
| 4,568,123 A | 2/1986 | Yasui et al. |
| 4,604,777 A | 8/1986 | Meeks |

(Continued)

FOREIGN PATENT DOCUMENTS

| CN | 201268246 Y | 7/2009 |
| CN | 102143857 A | 8/2011 |

(Continued)

OTHER PUBLICATIONS

International Search Report and Written Opinion for International Application No. PCT/CN2016/103544, with International Filing Date Oct. 27, 2016.

(Continued)

*Primary Examiner* — David E Allred
(74) *Attorney, Agent, or Firm* — Carlson, Gaskey & Olds, P.C.

(57) ABSTRACT

This disclosure generally relates to a bushing arrangement for a headrest assembly of a seat in a vehicle. In one example of the present disclosure, the headrest assembly includes a rod configured to connect the headrest assembly to a seat back, and a head restraint. The head restraint includes a bushing configured to contact the rod and a spring configured to impart a force on an outer surface of the bushing. This arrangement allows a user to smoothly raise and lower the head restraint, and increases the stability of the head restraint relative to the rod.

9 Claims, 4 Drawing Sheets

(56) References Cited

U.S. PATENT DOCUMENTS

| | | | |
|---|---|---|---|
| 5,080,437 A * | 1/1992 | Pesta | B60N 2/818 297/410 |
| 5,667,276 A * | 9/1997 | Connelly | B60N 2/815 297/410 |
| 6,802,565 B2 | 10/2004 | Isaacson | |
| 7,044,555 B2 | 5/2006 | Saberan | |
| 7,108,327 B2 | 9/2006 | Locke et al. | |
| 7,306,287 B2 | 12/2007 | Linardi et al. | |
| 7,506,936 B2 | 3/2009 | Saberan | |
| 7,517,009 B2 | 4/2009 | Mauro et al. | |
| 7,562,936 B1 | 7/2009 | Veine et al. | |
| 8,182,037 B2 | 5/2012 | Jeong et al. | |
| 8,573,703 B2 | 11/2013 | Poehlmann et al. | |
| 8,794,705 B2 | 8/2014 | Steinmetz et al. | |
| 8,814,272 B2 | 8/2014 | Poehlmann et al. | |
| 8,864,235 B2 | 10/2014 | Menges et al. | |
| 8,876,211 B2 | 11/2014 | Tscherbner et al. | |
| 9,428,089 B2 | 8/2016 | Weiland | |
| 10,052,989 B2 * | 8/2018 | Sasaki | B60N 2/818 |
| 10,336,230 B2 * | 7/2019 | Novin | F16C 11/103 |
| 2004/0145228 A1 | 7/2004 | Terrand et al. | |
| 2006/0197366 A1 | 9/2006 | Saberan | |
| 2006/0226686 A1 | 10/2006 | Yu | |
| 2012/0007403 A1 * | 1/2012 | Menges | B60N 2/809 297/391 |
| 2012/0080925 A1 | 4/2012 | Steinmetz et al. | |
| 2012/0161490 A1 | 6/2012 | Poehlmann et al. | |
| 2013/0069412 A1 | 3/2013 | Tscherbner et al. | |
| 2014/0145489 A1 | 5/2014 | Wang et al. | |
| 2015/0145306 A1 * | 5/2015 | Zimmermann | B60N 2/682 297/391 |
| 2015/0329021 A1 | 11/2015 | Aquillue et al. | |
| 2016/0200229 A1 * | 7/2016 | Boesl | B60N 2/806 297/391 |
| 2016/0243965 A1 | 8/2016 | Hoffmann | |
| 2018/0178697 A1 * | 6/2018 | Wehling | B60N 2/897 |
| 2018/0257530 A1 * | 9/2018 | Munemura | B60N 2/897 |

FOREIGN PATENT DOCUMENTS

| | | | |
|---|---|---|---|
| CN | 102310792 A | 1/2012 | |
| CN | 102700442 A | 10/2012 | |
| CN | 202623995 U | 12/2012 | |
| CN | 102917619 A | 2/2013 | |
| CN | 204136826 U | 2/2015 | |
| CN | 204564414 U | 8/2015 | |
| CN | 105102264 A | 11/2015 | |
| DE | 29613073 U | 9/1996 | |
| DE | 102010026042 A1 | 1/2012 | |
| DE | 112010005658 B4 | 3/2015 | |
| EP | 0864461 B1 | 11/1997 | |
| FR | 2458422 A1 * | 1/1981 | B60N 2/826 |
| FR | 2889494 A1 * | 2/2007 | B60N 2/815 |
| FR | 2919537 A1 | 2/2009 | |
| GB | 2064312 A | 11/1980 | |
| JP | 62157844 | 7/1987 | |
| KR | 101836503 A | 8/2013 | |
| RU | 2186695 C2 | 8/2002 | |
| WO | 2013081404 A1 | 6/2013 | |

OTHER PUBLICATIONS

International Application No. PCT/CN2016/103544, with International Filing Date of Oct. 27, 2016.

* cited by examiner

BUSHING ARRANGEMENT FOR HEADREST ASSEMBLY

CROSS-REFERENCE TO RELATED APPLICATIONS

This application is a National Stage filing for International Application No. PCT/CN2018/083917, filed on Apr. 20, 2018, which is incorporated by reference herein in its entirety.

TECHNICAL FIELD

This disclosure relates to a bushing arrangement for a headrest assembly, which may be a headrest assembly of a seat in a motor vehicle.

BACKGROUND

Headrests are configured to be positioned relative to the back of an occupant's head and neck. Known headrests can be vertically adjusted by raising and lowering a head restraint to accommodate occupants of different heights.

SUMMARY

A headrest assembly according to an exemplary aspect of the present disclosure includes, among other things, a rod configured to connect the headrest assembly to a seat back, and a head restraint. The head restraint includes a bushing configured to contact the rod and a spring configured to impart a force on an outer surface of the bushing.

In a further non-limiting embodiment of the foregoing headrest assembly, the bushing is integrally formed by a single piece of material.

In a further non-limiting embodiment of any of the foregoing headrest assemblies, the bushing includes an inner surface configured to contact the rod, and a slot extending from the inner surface to the outer surface.

In a further non-limiting embodiment of any of the foregoing headrest assemblies, the slot is bisected by a plane spaced-apart from an axis of the rod.

In a further non-limiting embodiment of any of the foregoing headrest assemblies, the bushing includes a first section and a second section spaced-apart from one another by the slot, and the spring is configured to urge the first and second sections toward one another.

In a further non-limiting embodiment of any of the foregoing headrest assemblies, the rod extends along an axis, and the spring imparts the force onto the bushing in a direction normal to the axis.

In a further non-limiting embodiment of any of the foregoing headrest assemblies, the spring imparts the force onto the bushing in a direction parallel to a length of the spring.

In a further non-limiting embodiment of any of the foregoing headrest assemblies, the spring is a coil spring disposed about an axis spaced-apart from the axis of the rod.

In a further non-limiting embodiment of any of the foregoing headrest assemblies, the head restraint includes a body providing a first seat configured to support the bushing and a second seat configured to support the spring.

In a further non-limiting embodiment of any of the foregoing headrest assemblies, the second seat is cylindrical.

In a further non-limiting embodiment of any of the foregoing headrest assemblies, the head restraint includes four of the bushings and four of the springs, each of the springs configured to impart a force onto an outer surface of a respective one of the bushings.

A seat for a motor vehicle according to an exemplary aspect of this disclosure includes, among other things, a seat back and a headrest assembly. The headrest assembly includes a rod configured to connect the headrest assembly to the seat back, and a head restraint. The head restraint includes a bushing configured to contact the rod and a spring configured to impart a force on an outer surface of the bushing.

In a further non-limiting embodiment of the foregoing seat, the bushing is integrally formed by a single piece of material.

In a further non-limiting embodiment of any of the foregoing seats, the bushing includes an inner surface configured to contact the rod, the bushing includes a slot extending from the inner surface to the outer surface, and the slot is bisected by a plane spaced-apart from an axis of the rod.

In a further non-limiting embodiment of the foregoing seat, the spring imparts the force onto the bushing in a direction normal to the axis of the rod and in a direction parallel to the length of the spring.

BRIEF DESCRIPTION OF THE DRAWINGS

In FIG. 6, the spring engages the flat outer surface of the bushing.

In FIG. 7, the bushing includes a recess receiving an end of the spring.

DETAILED DESCRIPTION

This disclosure relates to a bushing arrangement for a headrest assembly of a seat in a vehicle. In one example of the present disclosure, the headrest assembly includes a rod configured to connect the headrest assembly to a seat back, and a head restraint. The head restraint includes a bushing configured to contact the rod and a spring configured to impart a force on an outer surface of the bushing. This arrangement allows a user to smoothly raise and lower the head restraint, and increases the stability of the head restraint relative to the rod.

Figure 1:
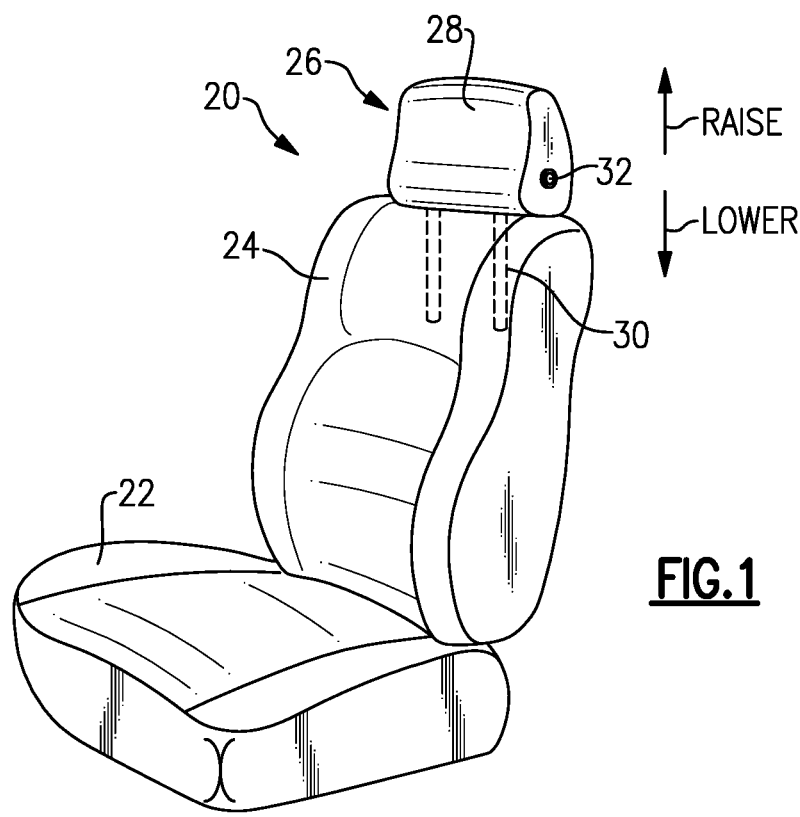
FIG. 1 is a perspective view of an example seat including an example headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and a rod 30. The rod 30 may be provided by a single, bent piece of material, or separately formed elements that have been connected together. The seat 20 may further include two separate rods.

The head restraint 28 is vertically adjustable relative to the seat back 24 along the rod 30 in a "raise" direction and a "lower" direction. In this example, the head restraint 28 includes a push button 32 which, when depressed, allows adjustment of the head restraint 28. While a push button 32 is discussed herein, other activation devices come within the scope of this disclosure. The push button 32 activates a mechanism which selectively engages and disengages the rod 30 to allow movement of the head restraint in the "raise" and "lower" directions. One such mechanism is disclosed in U.S. patent application Ser. No. 15/738,001, filed on Dec. 19, 2017, the entirety of which is herein incorporated by reference.

The "raise" and "lower" directions are labeled in FIG. 1 for ease of reference. However, the terms "raise" and "lower" are used for purposes of explanation only and should not be otherwise considered limiting. Similarly, directional terms like the term "vertical" should not be considered limiting. In this disclosure, the terms "raise" and "lower" are used with reference to the position of the head restraint 28 relative to the seat back 24, and the term "vertical" is used relative to the normal, upright position of the seat 20.

Figure 2:
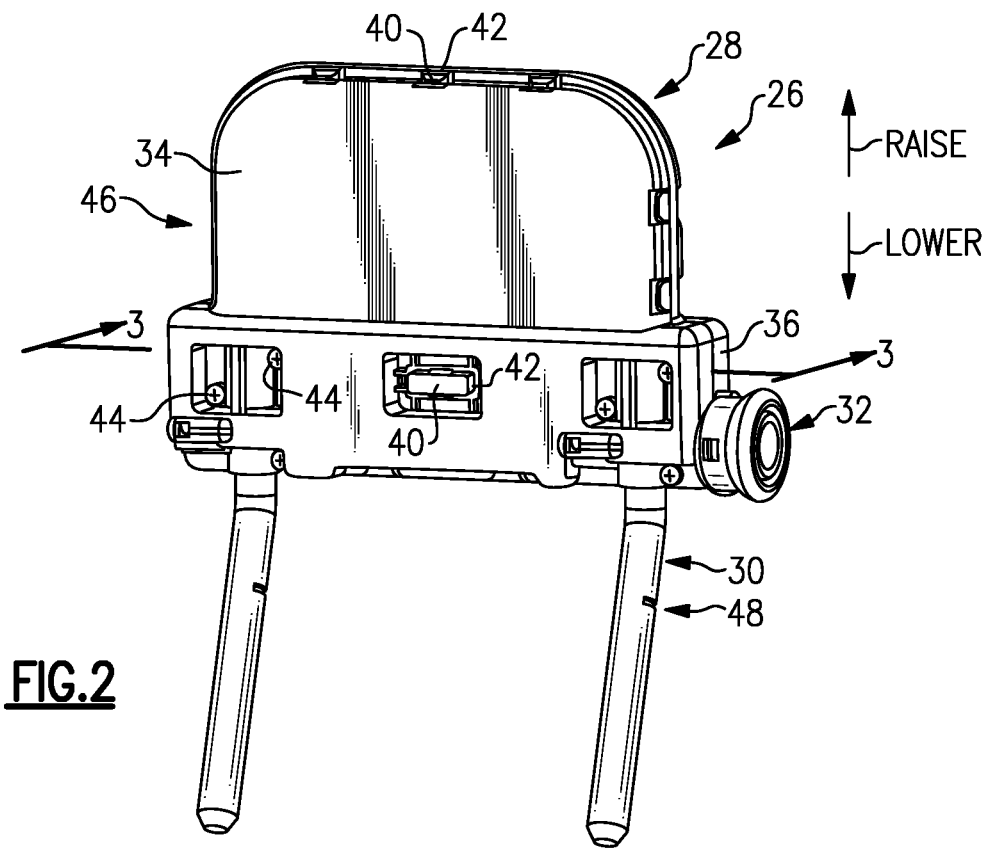
FIG. 2 is a perspective view of an example headrest assembly.

FIG. 2 illustrates the headrest assembly 26 without any padding or covering attached to the head restraint 28. The headrest assembly 26 in this example includes a first cover 34 and a second cover 36. The first and second covers 34, 36 are connected together and define an interior space 38 (FIG. 3) between the covers 34, 36. The first cover 34 in this example is a front cover configured to face the rear of an occupant's head and/or neck when in use. The second cover 36 is a rear cover. The first and second covers 34, 36 are connected together by a plurality of latches 40, which project from the second cover 36 and are received in corresponding recesses 42 of the first cover 34. Further, there are a plurality of fasteners 44 connecting the first and second covers 34, 36.

While not illustrated in FIG. 2, the first and second covers 34, 36 are configured to support a cushion and an encasement. In FIG. 1 the head restraint 28 supports a cushion, which may include foam encased in fabric, such as leather or cloth.

The rod 30 includes an upper portion 46 surrounded by the first and second covers 34, 36 and received in the interior space 38, and a lower portion 48 configured to couple to the seat back 24. The rod 30 is generally configured to remain fixed relative to the seat back 24. The head restraint 28 is configured to selectively move along the rod 30 in the "raise" and "lower" directions when the push button 32 is depressed. The push button 32 is support by at least one of the first and second covers 34, 36.

Figure 3:
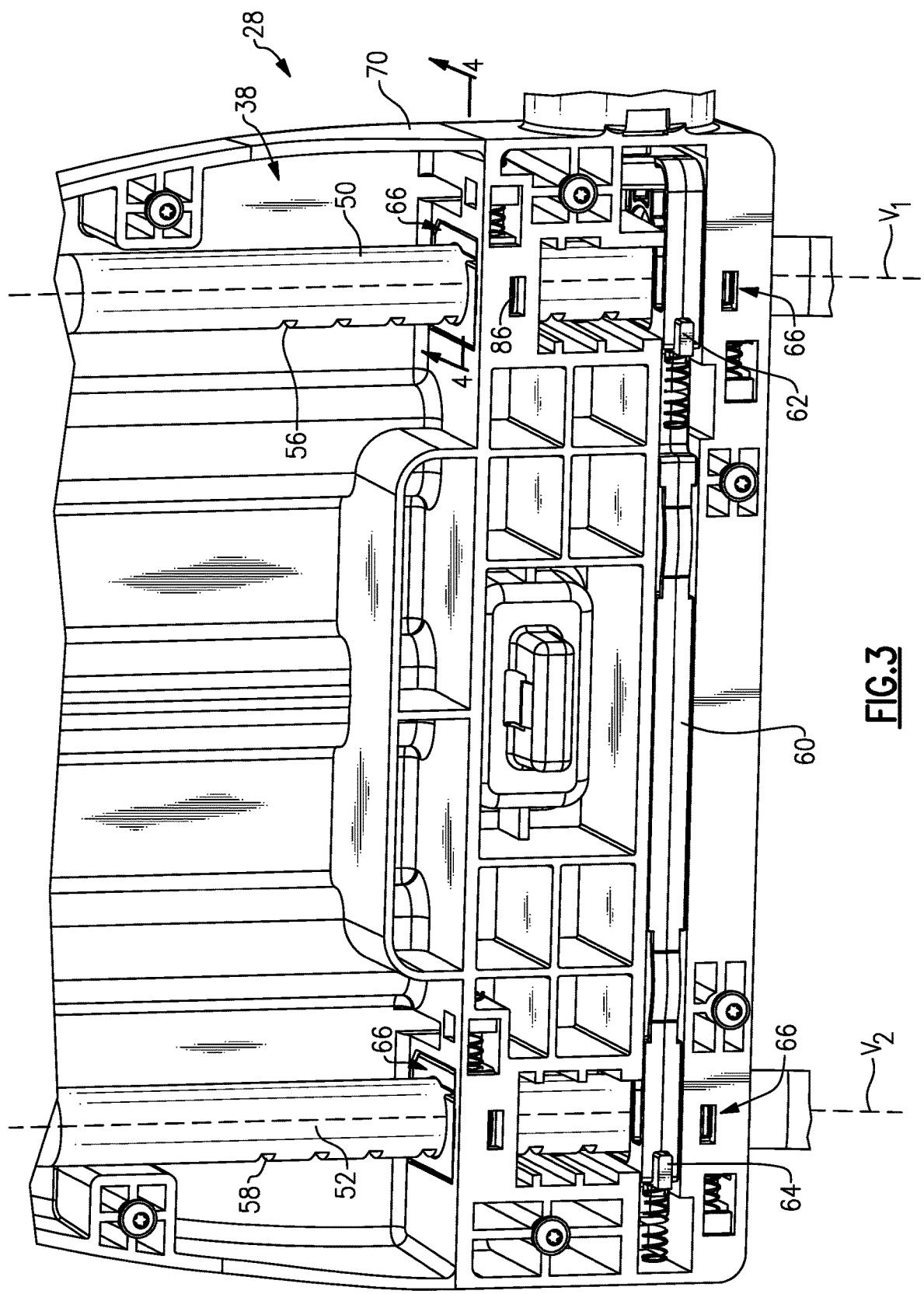
FIG. 3 is a view of a portion of an interior of an example headrest assembly.

FIG. 3 is a view taken along line 3-3 of FIG. 2 and illustrates the detail of the interior space 38. As shown in FIG. 3, the rod 30 includes a first vertical portion 50 and a second vertical portion 52. The first and second vertical portions 50, 52 are arranged generally along first and second vertical axes V1, V2, and are spaced-apart by a horizontal portion of the rod 30, which is not shown. The first and second vertical portions 50, 52 each have a plurality of recesses 56, 58. The recesses 56, 58 in this example are in the form of notches or slots formed on an outer surface of the first and second vertical portions 50, 52, respectively.

In this example, the head restraint 28 includes a pushing plate 60 having a first locking portion 62 and a second locking portion 64. In this example, the pushing plate 60 is a single structure including, or supporting, the first and second locking portions 62, 64. The arrangement between the pushing plate 60, the push button 32, and the rod 30 is described in more detail in the '001 Application (cited above), which, again, is herein incorporated by reference in its entirety. In general, though, when the push button 32 is depressed, the pushing plate 60 slides laterally to the left, relative to FIG. 3, which causes the first and second locking portions 62, 64 to move out of the recesses 56, 58, thereby allowing a user to vertically adjust the position of the head restraint 28 relative to the rod 30.

In this disclosure, the head restraint 28 includes a plurality of bushings 66, which are arranged relative to the rod 30 in order to increase the stability of the head restraint 28 and to allow a user to smoothly adjust the head restraint 28. The head restraint 28 includes four bushings 66 in this example. Specifically, the head restraint 28 includes two bushings 66 configured to contact the first vertical portion 50 of the rod 30 and two bushings 66 configured to contact the second vertical portion 52 of the rod. The bushings 66 are spaced-apart from one another along the axes V1, V2 in order to increase the stability of the head restraint 28. While four bushings 66 are disclosed, this disclosure extends to headrest assemblies with one or more bushings.

Figure 4:
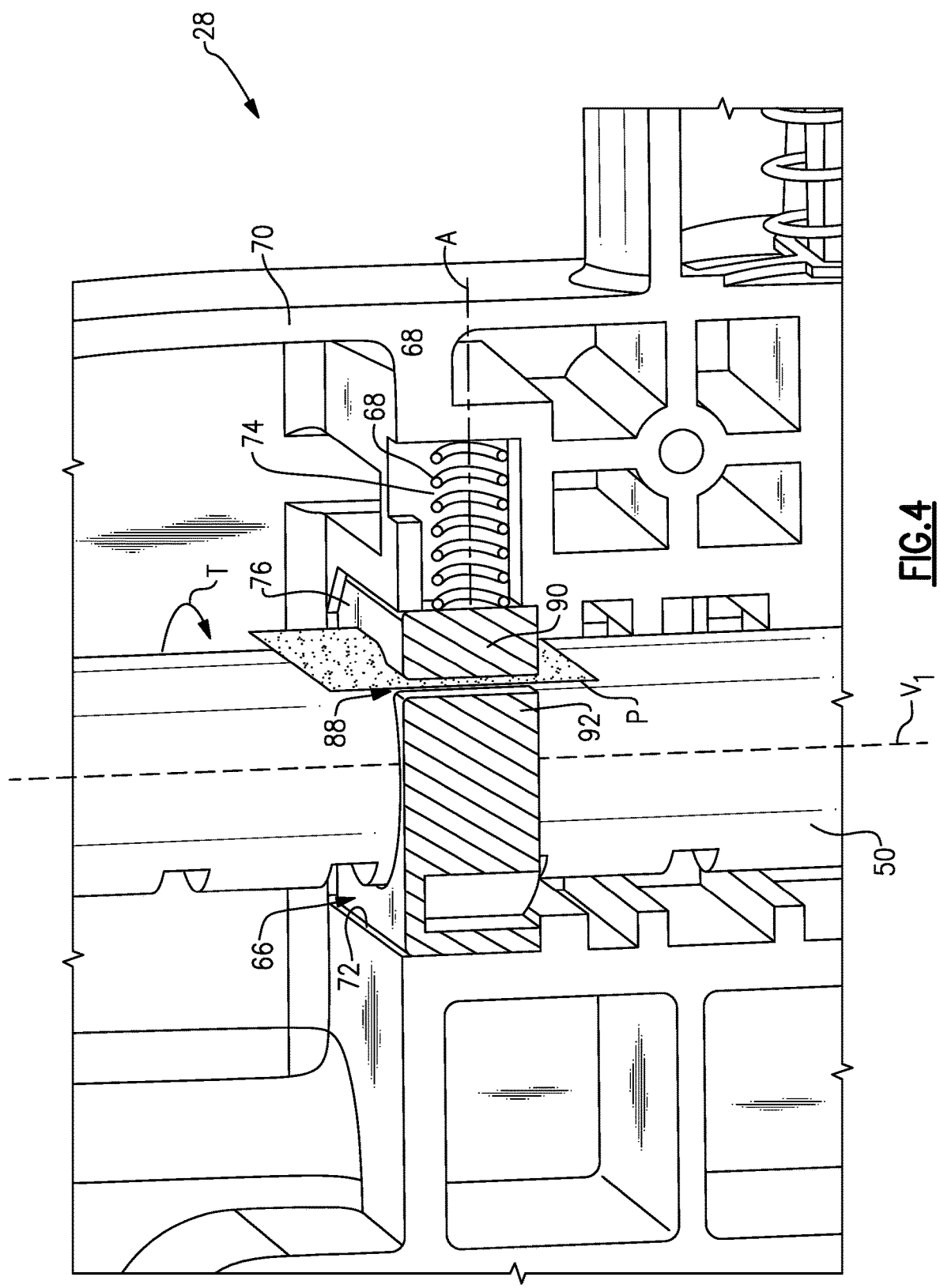
FIG. 4 is a cross-sectional view taken along line 4-4 in FIG. 3, and in particular illustrates an example arrangement between a bushing and a spring.
Figure 5:
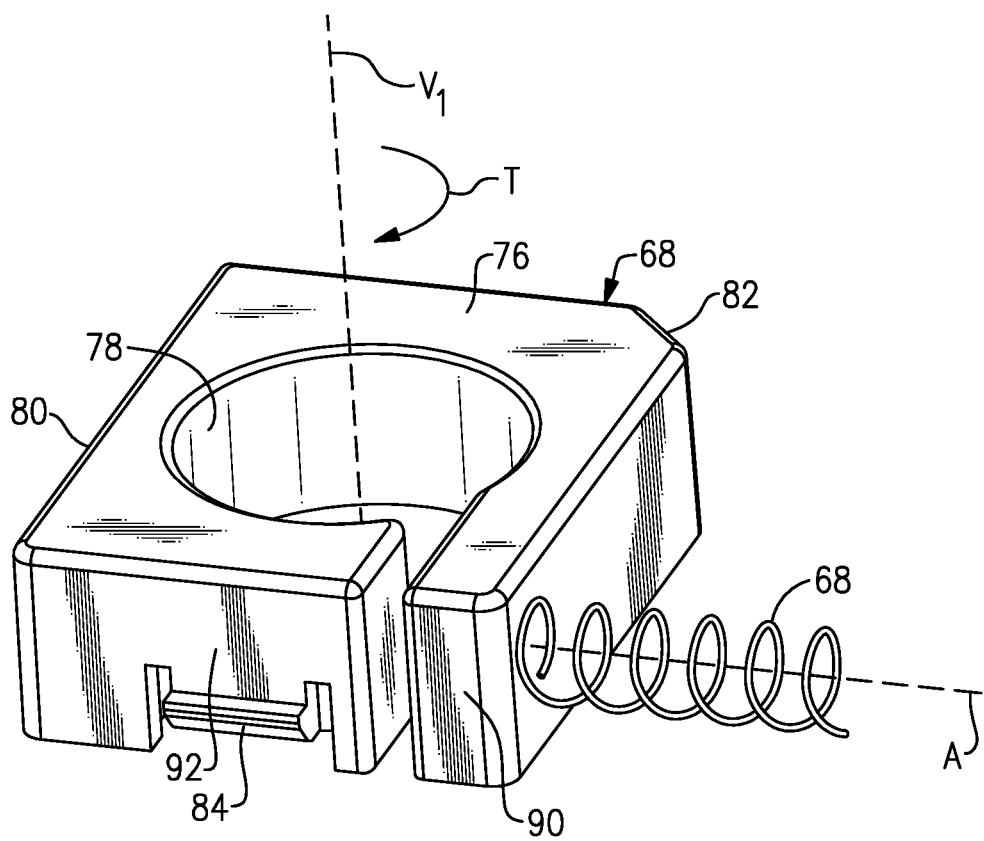
FIG. 5 is a perspective view of the arrangement of bushing and the spring of FIG. 4, without the remainder of the head restraint for ease of reference.

FIG. 4 is a cross-sectional view taken along line 4-4 in FIG. 3, and illustrates an exemplary arrangement of the head restraint 28 relative to one of the bushings 66. It should be understood that the remaining bushings 66 would be arranged similarly. As shown in FIG. 4, the head restraint 28 includes a spring 68 configured to impart a force on the bushing 66. In turn, the bushing 66 essentially squeezes against the rod 30. In this disclosure, it is not a function of the bushing 66 to lock the head restraint 28 in place relative to the rod 30. Instead, locking is managed by the push button 32 and the pushing plate 60. The bushing 66 imparts a force on the exterior of the rod 30, which increases the overall stability of the head restraint 28 and provides a smooth feel while a user adjusts the head restraint 28. FIG. 5 illustrates the arrangement of the bushing 66 and spring 68 without the remainder of the head restraint for ease of reference.

With joint reference to FIGS. 4 and 5, the bushing 66 and the spring 68 are supported by a body 70 of the head restraint. In this example, the body 70 is made of a plastic material and is formed by injection molding. The body 70 includes a first seat 72 configured to receive the bushing 66. The first seat 72 is a sized and shaped to correspond to the outer contour of the bushing 66. The body 70 further includes a second seat 74, which is sized and shaped to correspond to the contour of the spring 68. In this example, the second seat 74 is substantially cylindrical. While a spring 68 is shown in the illustrated embodiments, in another embodiment, no spring is required. In that embodiment, the first seat 72 and bushing 66 are sized such that the first seat 72 imparts a force onto the bushing 66, which causes the bushing 66 to essentially squeeze the rod 30.

Turning back to the illustrated embodiment, the bushing 66 is integrally formed by a single piece of material, in this example. The material may be a plastic material. The bushing 66 may be formed by injection molding or another known type of manufacturing process. Because the bushing 66 is integrally formed by a single piece of material, it includes a one-piece, unitary body 76. No part of the body 76 is configured to move independent of any other part. Further, the bushing 66 and the spring 68 are separate components. In other words, the bushing 66 does not include or contain the spring 68.

The body 76 has an inner surface 78 and an outer surface 80. The inner surface 78 is arcuate and concentric with the vertical axis V1 of the first vertical portion 50 of the rod 30. Further, the inner surface 78 is smooth and is configured to directly contact the rod 30. The smooth nature of the inner surface 78 makes it such that the inner surface 78 does not enter into the recesses 56, 58, and thus, as mentioned above, the bushing 66 does not serve to lock the head restrain 28.

The outer surface 80 defines a perimeter of the bushing 66. The outer surface 80, in this example, includes a chamfered corner 82, which assists with alignment during assembly, and further includes a tab 84, which may act as a latch. The tab 84 is configured to interlock with a corresponding recess 86 (FIG. 3) formed in the body 70 in order to hold the bushing 66 in place in the seat 72.

The bushing 66 in, this example, is configured to flex under the force of the spring 68. The flexing of the bushing 66 places the bushing 66 under torsion (represented by T in FIGS. 4 and 5), and urges the inner surface 78 toward the vertical axis V1. In order to facilitate this flexing, the bushing 66 includes a slot 88 extending from the inner surface 78 to the outer surface 80. The bushing 66 includes a first section 90 on one side of the slot 88, and a second section 92 on another side of the slot 88. The first and second sections 90, 92, are spaced-apart from one another by virtue of the slot 88. Further, the first and second sections 90, 92, are urged toward one another under the force of the spring 68.

In this example, the slot 88 is bisected by a plane P spaced-apart from the first vertical axis V1 of the rod 30. In this way, the bushing 66 is not symmetrical about the plane P. Under the force of the spring 68, the first and second sections 90, 92 are urged toward the plane P.

The spring 68 is arranged in the seat 74 such that the spring 68 imparts a force onto the outer surface 80 of the bushing 66. In this example, the spring 68 is a coil spring disposed about an axis A. The axis A is normal to the plane P and the first vertical axis V1. The spring 68 has a length extending in a direction parallel to the axis A, the spring 68 imparts a force onto the outer surface 80 of the bushing 66 in a direction parallel to the length of the spring and the axis A. Further, in this example, the axis A is spaced-apart from the first vertical axis V1, such that the axis A and the first vertical axis V1 never intersect. Such an arrangement increases the ability of the spring 68 to flex the bushing 66.

Figure 6:
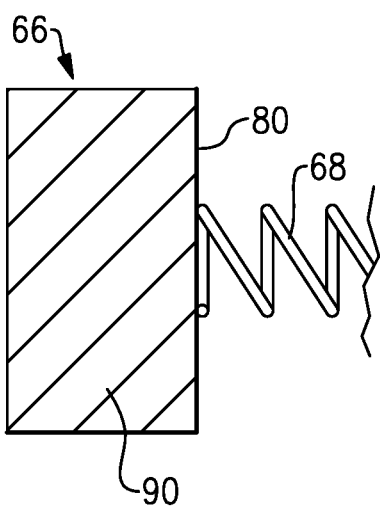
FIG. 6 is a cross-sectional view of the interaction between the bushing and the spring.
Figure 7:
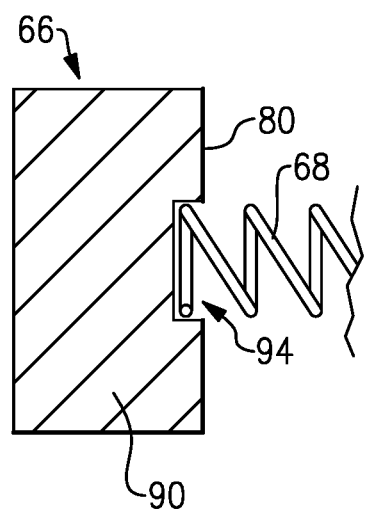
FIG. 7 is a cross-sectional view of an interaction between another example bushing and the spring.

In the embodiment of FIG. 5, the spring 68 contacts the outer surface 80 of the bushing 66. As shown in FIG. 6, the outer surface 80 is flat at the point of contact with the spring 68. In other embodiments, however, the bushing 66 may include a spring seating feature, such as a recess 94, which is shown in FIG. 7. The recess 94 serves as a seat for the spring 68, thereby preventing unwanted movement of the spring 68. The recess 94 is recessed inward of the outer surface 80. While a recess 94 is shown, it should be understood that other spring seating features come within the scope of this disclosure. For instance, in place of a recess, the outer surface 80 may include a male, projecting tab, which projects into the interior of the spring 68. Even in embodiments where the bushing 66 has a recess or male projecting tab configured to interact with the spring 68, the bushing 66 and spring 68 are still separate components, and one does not include or contain the other.

Again, it should be understood that directional terms such as "vertical" and "horizontal" are used above with reference to the normal, upright position of a car seat in a vehicle. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
a rod configured to connect the headrest assembly to a seat back; and
a head restraint including a bushing configured to contact the rod and a spring configured to impart a force on an outer surface of the bushing;
wherein the bushing is integrally formed by a single piece of material;
wherein the bushing includes an inner surface configured to contact the rod, and a slot extending from the inner surface to the outer surface;
wherein the slot is bisected by a plane spaced-apart from a central axis of the rod;
wherein:
the bushing includes a first section and a second section spaced-apart from one another by the slot, and
the spring is configured to urge the first and second sections toward one another; and
wherein the spring is a separate piece from the bushing and applies the force to the bushing by applying an opposing force to a body of the head restraint that surroundingly holds the bushing in the headrest assembly.

2. The headrest assembly as recited in claim 1, wherein:
the rod extends along an axis, and
the spring imparts the force onto the bushing in a direction normal to the axis.

3. The headrest assembly as recited in claim 2, wherein the spring imparts the force onto the bushing in a direction parallel to a length of the spring.

4. The headrest assembly as recited in claim 3, wherein the spring is a coil spring disposed about an axis spaced-apart from the axis of the rod.

5. The headrest assembly as recited in claim 1, wherein the head restraint includes a body providing a first seat configured to support the bushing and a second seat configured to support the spring.

6. The headrest assembly as recited in claim 5, wherein the second seat is cylindrical.

7. The headrest assembly as recited in claim 1, wherein the head restraint includes four of the bushings and four of the springs, each of the springs configured to impart a force onto an outer surface of a respective one of the bushings.

8. A seat for a motor vehicle, comprising:
a seat back; and
a headrest assembly, comprising:
a rod configured to connect the headrest assembly to the seat back; and
a head restraint including a bushing configured to contact the rod and a spring configured to impart a force on an outer surface of the bushing;
wherein the bushing is integrally formed by a single piece of material;
wherein:
the bushing includes an inner surface configured to contact the rod, the bushing includes a slot extending from the inner surface to the outer surface, and the slot is bisected by a plane spaced-apart from a central axis of the rod;

wherein:

the bushing includes a first section and a second section spaced-apart from one another by the slot, and the spring is configured to urge the first and second sections toward one another; and wherein the spring is a separate piece from the bushing and applies the force to the bushing by applying an opposing force to a body of the head restraint that surroundingly holds the bushing in the headrest assembly.

9. The seat as recited in claim 8, wherein the spring imparts the force onto the bushing in a direction normal to the axis of the rod and in a direction parallel to the length of the spring.

* * * * *